J. C. DAMAN.
Grain-Drill.

No. 164,151.  Patented June 8, 1875.

WITNESSES:
C. Neveux
A. F. Terry

INVENTOR:
James C. Daman
BY Munn & Co
ATTORNEYS.

UNITED STATES PATENT OFFICE.

JAMES C. DAMAN, OF ELK POINT, DAKOTA TERRITORY.

IMPROVEMENT IN GRAIN-DRILLS.

Specification forming part of Letters Patent No. 164,151, dated June 8, 1875; application filed January 25, 1875.

*To all whom it may concern:*

Figure 2:
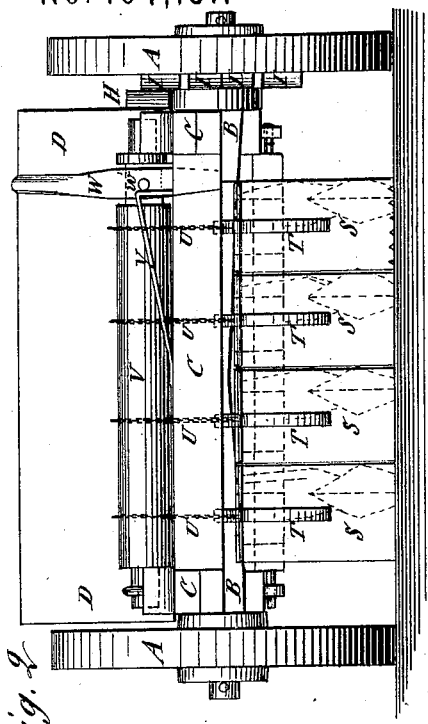
Figure 3:
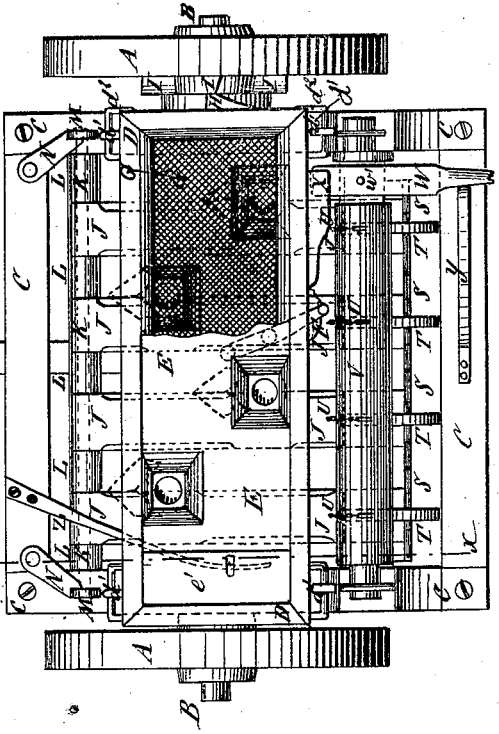
Figure 1:
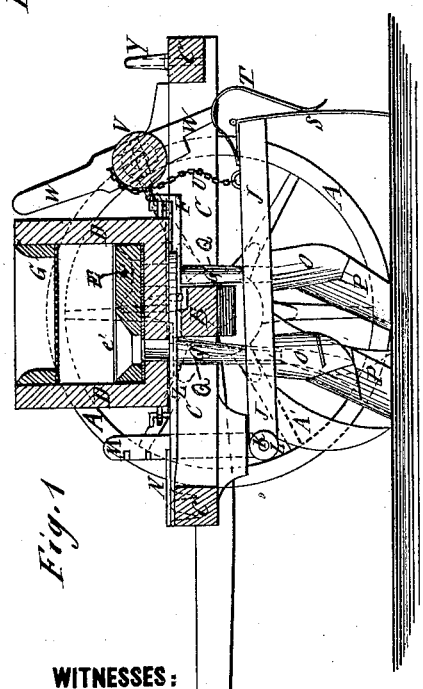
Figure 4:
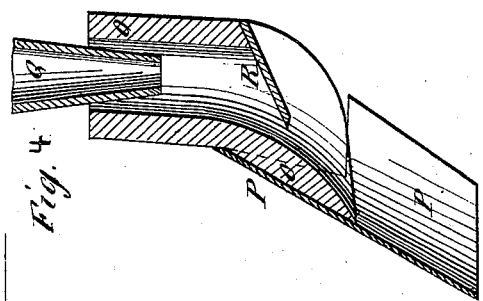

Be it known that I, JAMES C. DAMAN, of the city of Elk Point, county of Union and Territory of Dakota, have invented an Improvement in Grain-Drill, of which the following is a specification:

In the drawing, Figure 1 is a vertical section of my improved grain-drill taken through the line $x\ x$, Fig. 3. Fig. 2 is a rear view of the same. Fig. 3 is a top view of the same, part of the screen being broken away. Fig. 4 is a vertical section of one of the plow-standards.

The machine embodies an improvement in the class of grain-drills having a reciprocating or shaking hopper; and the invention relates particularly to the arrangement for simultaneously elevating the seed-coverers and throwing the seed-box or hopper out of action, as hereinafter described.

A A are the wheels, B the axle, C the frame of the machine. The seed-box or hopper D is kept in place, and at the same time allowed longitudinal motion, by hook-pins $d^1$, which pass through keepers $d^2$. A screen, G, is placed in seed-box D, through which seed passes. A perforated slide, E, controls the escape of seed, and is operated by lever F. The reciprocation or agitation of the seed-box is caused by beveled projections I (on wheel A) and the spring Z, whose operation will be readily understood. The plow-beams J are pivoted on rod K, and held apart thereat by washers L. The notched bars M serve to adjust the bar K higher or lower, being held in any desired adjustment by catches N. Plows P, attached to standards O, are V-shaped in cross-section and horizontal on the bottom edge. The hollow standards are connected with flexible tubes Q, and are provided with an inclined plate, R, to cause the seed to enter the furrow directly in rear of plows P. The hinged seed-covering plates S have curved springs T, which permit them to yield to and pass over serious obstructions.

I will now describe the construction and arrangement of the parts which co-operate with the reciprocating seed-box, and form the subject of the claim.

To the upper edge of the rear ends of the plow-beams J are hinged the upper ends of plates S, the lower ends of which rest upon the surface of the ground. T are curved springs, the upper ends of which are attached to the plow-beams J, and their lower ends rest against the middle part of the hinged covering-plates S, as shown in Figs. 1 and 2. The springs T are made of such a strength as to hold the hinged covering-plates S to their work under ordinary circumstances, but should said plates strike an obstruction, the said springs will yield and allow the plates to spring back far enough to allow them to slide over said obstruction. The hinged plates S are made of such a width that their side edges may nearly touch each other, so that the entire surface of the ground may be made smooth and even, and all the seed covered to a uniform depth. The lower edges of the plates S may be made smooth or toothed, as may be desired. To the rear parts of the plow-beams J are attached the lower ends of chains or cords U, the upper ends of which are attached to a roller, V, the journals of which work in bearings attached to the rear parts of the side bars of the frame C. One end of the roller V is squared off to receive a lever, W, for turning the said roller to raise the plows from the ground when desired. The square mortise of the lever W is made larger than the squared part of the roller V, and the said lever is secured in place by a pin, $w'$. This construction allows the lever W to be oscillated laterally, the pin $w'$ serving as a pivot. The forward end of the lever W projects, so that when the lever W has been operated to turn the roller V, and raise the plows from the ground, its said forward end may come in contact with a block, X, attached to the seed-box D, and by being moved laterally may move the said seed-box to bring the incline H out of contact with the teeth I, and allow the machine to be drawn forward without agitating the said seed-box. As the handle of the lever W is moved downward and outward, to raise the plows, and take the incline H out of contact with the teeth I, it depresses the spring-catch Y, and as it comes into the desired position it is caught and held by said spring-catch, as shown in Fig. 3. The spring-catch Y is attached to the rear cross-bar of the frame C. To the plow-beams J, in front of the standards O, are attached cutters A', which may be made with curved forward edges, as shown in Fig. 1, so as to slide over obstructions that they cannot cut, or which may be circular revolving cutters if desired. If desired, the curved springs T may be replaced by spiral-springs, the rear ends of which are attached to the forward sides of the covers S, and their forward ends are attached to the under side of the plow-beams J, the form of the springs T being entirely immaterial.

Having thus fully described my invention, I claim as new and desire to secure by Letters Patent—

The combination of the lever W with roller V, beams J, reciprocating seed-box D, having spring Q, catch-block X, and spring-catch Y, applied to the frame C, all constructed and arranged as shown and described, to operate as specified.

JAMES C. DAMAN.

Witnesses:
JAMES HOMER,
JESSE B. WATSON.